US 9,205,798 B1

(12) United States Patent
Jindal et al.

(10) Patent No.: US 9,205,798 B1
(45) Date of Patent: Dec. 8, 2015

(54) AIRBAG FOR OBLIQUE VEHICLE IMPACTS

(71) Applicant: Ford Global Technologies, LLC, Dearborn, MI (US)

(72) Inventors: Pardeep Kumar Jindal, Canton, MI (US); Djamal Eddine Midoun, Ann Arbor, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 14/630,781

(22) Filed: Feb. 25, 2015

(51) Int. Cl.
*B60R 21/16* (2006.01)
*B60R 21/231* (2011.01)
*B60R 21/203* (2006.01)
*B60R 21/2338* (2011.01)

(52) U.S. Cl.
CPC ............. *B60R 21/231* (2013.01); *B60R 21/16* (2013.01); *B60R 21/203* (2013.01); *B60R 21/2338* (2013.01); *B60R 2021/23382* (2013.01)

(58) Field of Classification Search
CPC .... B60R 21/16; B60R 21/203; B60R 21/231; B60R 21/2338; B60R 2021/23382
USPC ........................................................ 280/743.2
See application file for complete search history.

(56) References Cited

U.S. PATENT DOCUMENTS

| 5,609,363 | A | * | 3/1997 | Finelli ................... B60R 21/231 280/730.1 |
| 6,511,093 | B2 | | 1/2003 | Buerkle et al. |
| 7,540,534 | B2 | | 6/2009 | Hasebe et al. |
| 7,661,700 | B2 | | 2/2010 | Imamura et al. |
| 7,690,683 | B2 | | 4/2010 | Parks et al. |
| 7,942,443 | B2 | | 5/2011 | Dennis et al. |
| 7,992,897 | B2 | | 8/2011 | Sekino et al. |
| 8,096,578 | B2 | | 1/2012 | Wigger et al. |
| 8,272,667 | B2 | | 9/2012 | Schneider et al. |
| 8,292,323 | B2 | | 10/2012 | Matsushima et al. |
| 8,632,094 | B2 | | 1/2014 | Schmidt et al. |
| 8,636,301 | B1 | * | 1/2014 | Wang ................... B60R 21/232 280/730.2 |
| 2006/0131847 | A1 | * | 6/2006 | Sato ....................... B60R 21/207 280/730.2 |

FOREIGN PATENT DOCUMENTS

| JP | 3331883 | B2 | | 7/2002 |
| JP | 2008044480 | A | * | 2/2008 |
| JP | 2008189023 | A | | 8/2008 |
| JP | 5012725 | B2 | | 6/2012 |

* cited by examiner

*Primary Examiner* — Faye M Fleming
(74) *Attorney, Agent, or Firm* — Frank A. MacKenzie; Bejin Bieneman PLC

(57) ABSTRACT

An airbag module includes a base and an airbag supported by the base. The airbag is inflatable from an uninflated position to an inflated position and presents an impact surface spaced from the base in the inflated position. The airbag includes an extension having a perimeter surface extending transversely from the impact surface around a perimeter of the extension. A tether extends from the base to the extension in the uninflated position. The extension catches the head of the test dummy if the test dummy slides along the impact surface during a vehicle oblique impact to slow and/or stop movement of the head of the test dummy toward a driver side door and/or A-pillar of the vehicle.

15 Claims, 6 Drawing Sheets

AIRBAG FOR OBLIQUE VEHICLE IMPACTS

BACKGROUND

Vehicles may include a variety of airbags deployable during vehicle impacts to absorb energy from occupants of the vehicles during the impact. The airbag may be a component of an airbag module including a base supporting the airbag, and an inflation device in communication with the airbag for inflating the airbag from an uninflated position to an inflated position. The airbag modules may be supported on a steering wheel of the vehicle, an instrument panel of the vehicle, a headliner of the vehicle, etc.

The vehicle may include an impact sensing system in communication with the airbag module for sensing a vehicle impact and instructing the inflation device to inflate the airbag when a vehicle impact is sensed. The impact sensing system may sense the direction of the impact and may selectively inflate, or not inflate, certain airbags of the vehicle when an impact is sensed based on the type and magnitude of impact that is sensed, e.g., based on direction, magnitude, etc.

Vehicles are subject to a variety of impact tests. These impact tests may include those standardized by the National Highway Traffic and Safety Agency (NHTSA). These impact tests may include, for example, oblique impact tests. One such test is the small overlap rigid barrier (SORB) test in which the vehicle is impacted in the front left corner of the vehicle at an oblique angle with a rigid barrier. In this test, the test dummy in the driver seat is urged forwardly and toward the driver side door of the vehicle. Another type of impact test is the angular impact test, in which the test dummy in the driver seat is urged in a cross-vehicle direction toward the driver side door of the vehicle.

DETAILED DESCRIPTION

Figure 1:
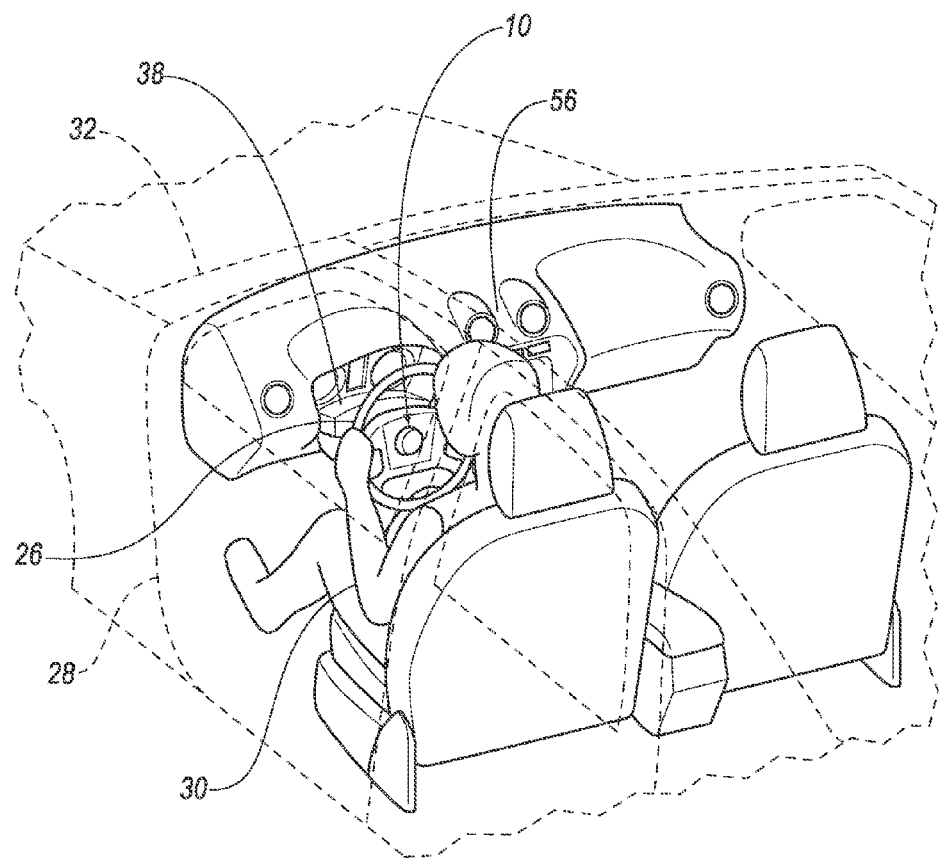
FIG. 1 is a perspective view of a vehicle including an airbag module supported by a steering wheel with the airbag of the airbag module in an uninflated position.
Figure 2:
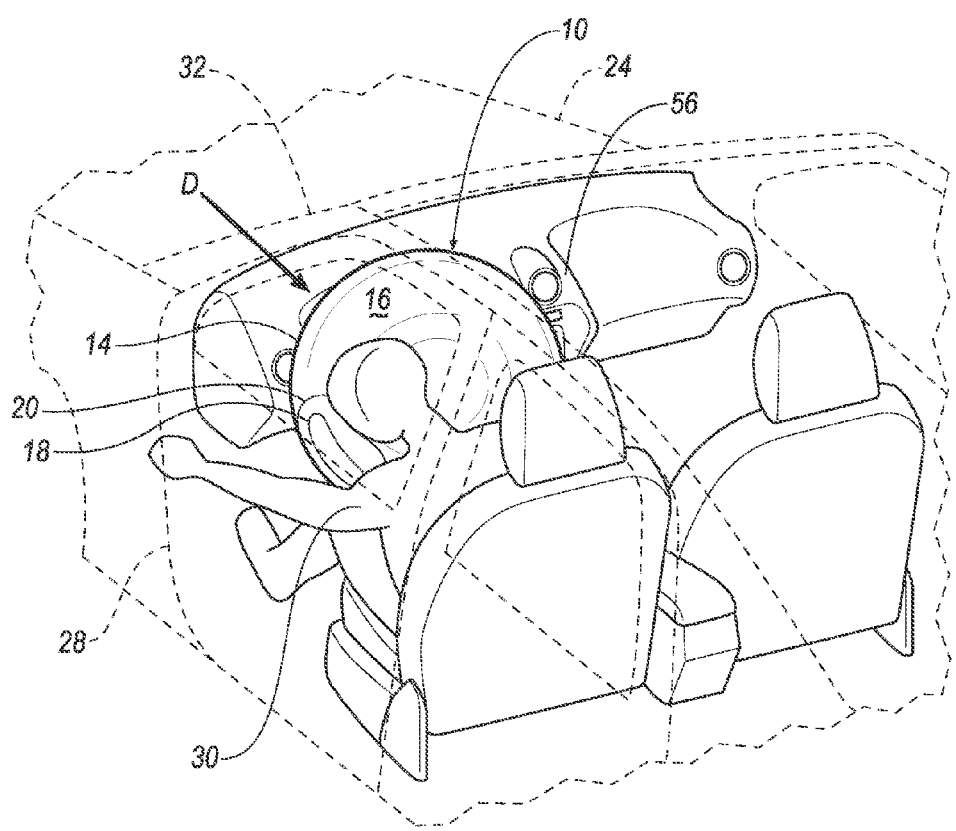
FIG. 2 is a perspective view of the vehicle including the airbag in an inflated position with an extension in a deployed position.
Figure 3:
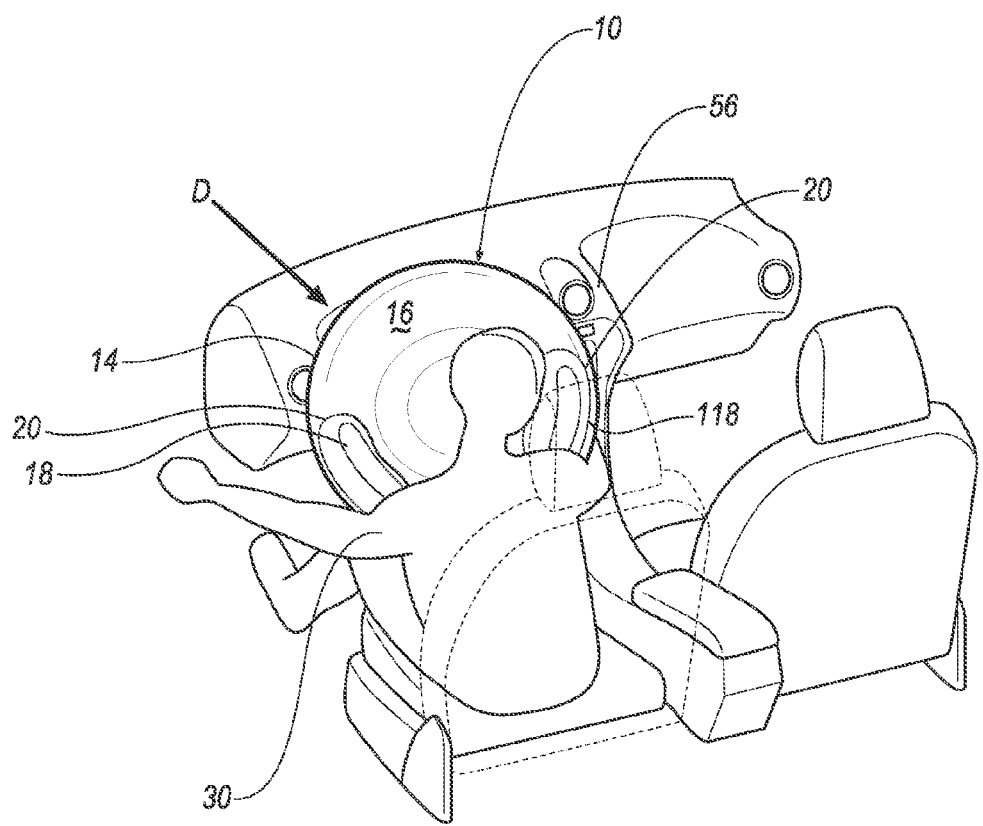
FIG. 3 is a perspective view of another embodiment of the airbag in the inflated position and with another extension in the deployed position.
Figure 4:
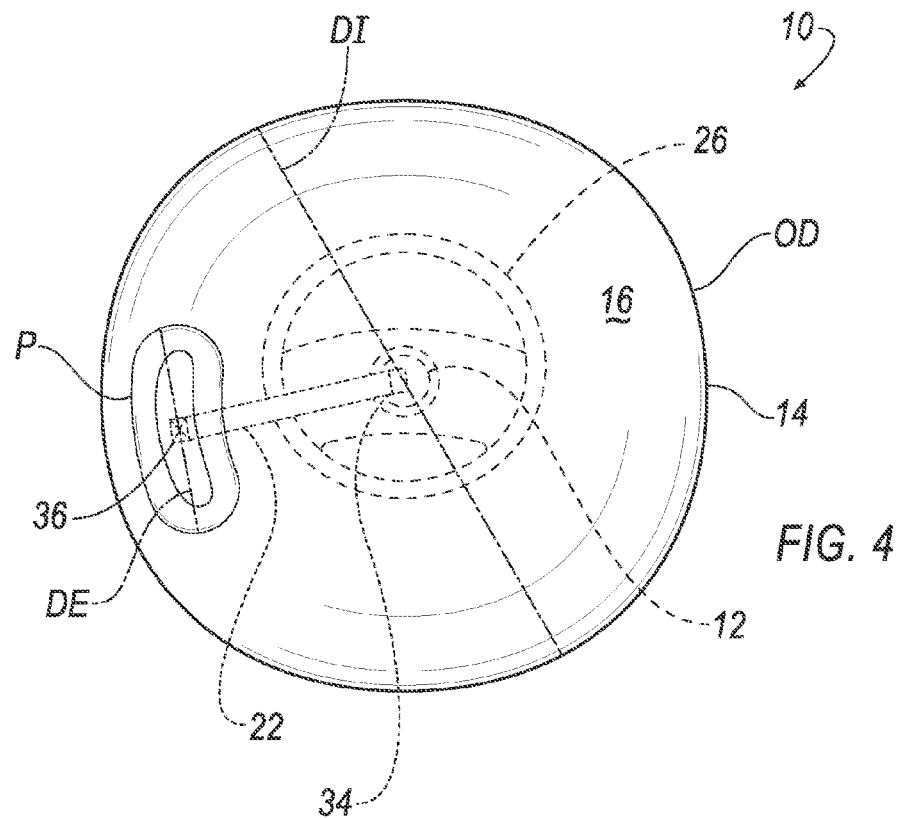
FIG. 4 is a perspective view of the airbag module with the airbag in the inflated position and an extension in an undeployed position.

With reference to the Figures, wherein like numerals indicate like parts throughout the several views, an airbag module 10 includes a base 12 and an airbag 14 supported by the base 12. The airbag 14 is inflatable from an uninflated position, as shown in FIG. 1, to an inflated position, as shown in FIGS. 2-7. The airbag 14 presents an impact surface 16 spaced from the base 12 in the inflated position. The airbag 14 includes an extension 18, 118 having a perimeter surface 20 extending transversely from the impact surface 16 around a perimeter P of the extension 18, 118, as shown in FIGS. 2, 4, and 6. A tether 22, 122, shown in FIGS. 3-6, extends from the base 12 to the extension 18, 118 in the uninflated position. The airbag module 10 is installed in a vehicle 24, as shown in FIGS. 1-3. The vehicle 24 may, for example, include a steering wheel 26 and a driver side door 28. The impact surface 16 is spaced from the steering wheel 26 in the inflated position. The vehicle 24 may, for example, include a center console 56. The center console 56 may be disposed in a middle of the vehicle 24 at the front of a passenger compartment of the vehicle 24, i.e., forward and to the right of the steering wheel 26.

The airbag 14 may include one or more extensions 18, 118, as shown in FIGS. 2 and 3. For example, with reference to FIG. 2, the airbag 14 may include the extension 18 on a left side of the impact surface 16. In other words, the extension 18 is disposed between the impact surface 16 and the driver side door 28. With reference to FIG. 3, the airbag 14 may include the extension 118 on the right side of the impact surface. In other words, the extension 118 is disposed between the impact surface 16 and the center console 56.

The extensions 18, 118 may be of identical construction, and common numerals are used herein to refer to common features of the two extensions 18, 118. The airbag 14 may include only the extension 18 on the left side of the impact surface 16, as shown in FIG. 2, both extensions 18, 118, as shown in FIG. 3, or only the extension 118 on the right side of the impact surface 16 (not shown). One, two, or more extensions 18, 118 may be disposed at various locations about the impact surface 16.

With reference to FIG. 2, during a left-side oblique impact test, such as during a small overlap rigid barrier (SORB) test, or a left-side angular impact test, the test dummy 30 may move forward and initially impact the impact surface 16 of the airbag 14. In addition to forward movement, the test dummy 30 also moves toward the left side of the vehicle 24, as shown in FIG. 2, i.e., in the general direction toward the driver side door 28 and/or an A-pillar 32. During this forward and left motion, the head of the test dummy 30 may slide along the impact surface 16 toward the driver side door 28 and/or the A-pillar 32 and may contact the extension 18, as shown in FIG. 2, to slow and/or stop movement of the head of the test dummy 30 toward the driver side door 28 and/or A-pillar 32. In other words, because the perimeter surface 20 of the extension 18 extends transversely from the impact surface 16, the extension 18 catches the head of the test dummy 30 as the test dummy 30 slides along the impact surface 16 to slow and/or stop movement of the head of the test dummy 30 toward the driver side door 28 and/or A-pillar 32.

With reference to FIG. 3, during a right-side oblique impact test, such as during a small overlap rigid barrier (SORB) test, or a right-side angular impact test, the test dummy 30 may move forward and initially impact the impact surface 16 of the airbag 14. In addition to forward movement, the test dummy 30 also moves toward the right side of the vehicle 24, as shown in FIG. 3, i.e., in the general direction toward the center console 56. During this forward and right motion, the head of the test dummy 30 may slide along the impact surface 16 toward the center console 56 and may contact the extension 118, as shown in FIG. 3, to slow and/or stop movement of the head of the test dummy 30 toward the center console 56. In other words, because the perimeter surface 20 of the extension 118 extends transversely from the impact surface 16, the extension 118 catches the head of the test dummy 30 as the test dummy 30 slides along the impact surface 16 to slow and/or stop movement of the head of the test dummy 30 toward the center console 56.

Figure 5:
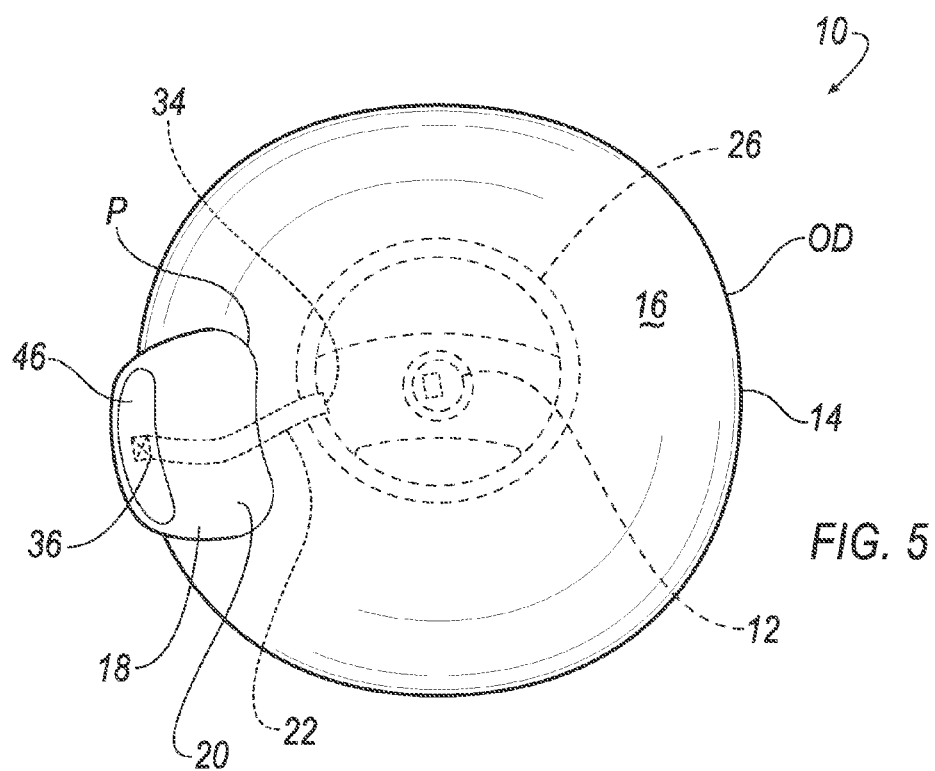
FIG. 5 is a perspective view of the airbag module of FIG. 4 with the airbag in the inflated position and the extension in a deployed position.
Figure 6:
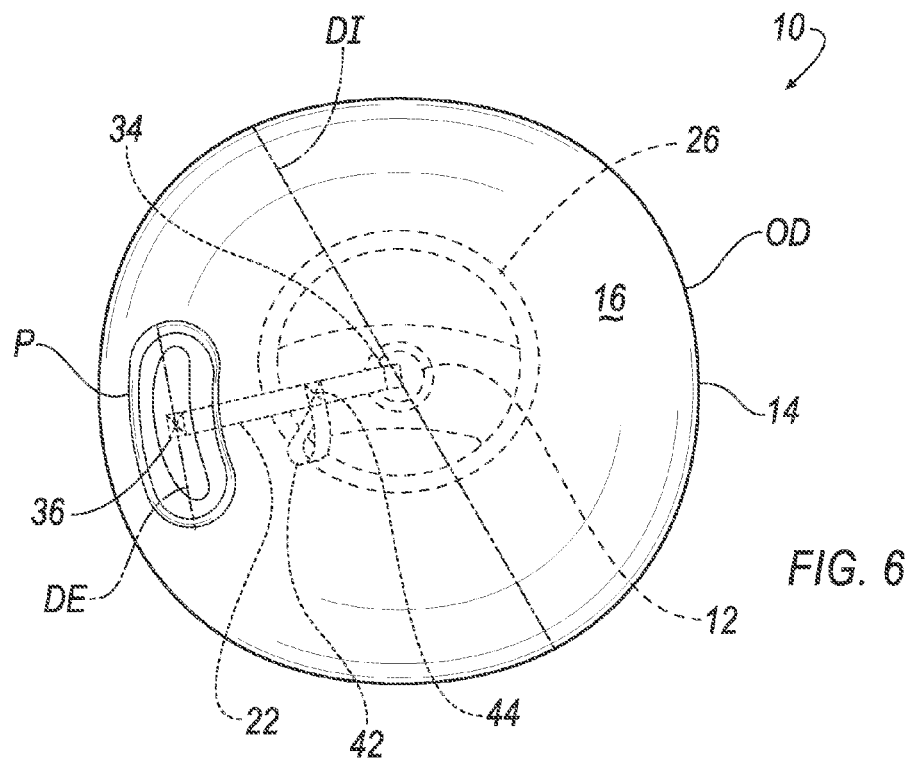
FIG. 6 is a perspective view of another embodiment of the airbag module with the airbag in the inflated position and the extension in the undeployed position.

A first embodiment of the tether 22 is shown in FIGS. 3-4 and a second embodiment of the tether 122 is shown in FIGS. 5-6. In both the embodiment of FIGS. 3-4 and the embodiment of FIG. 5-6, the tether 22, 122 may be formed of the same type of material as the airbag 14 or from any other suitable type of material.

Only the extension 18 is shown in FIGS. 3-6, however, it should be appreciated that the extension 118 may be connected to the base 12 with a tether 22 or a tether 122. The description below regarding the tether 22, 122 relative to the extension 18 is similarly applicable to the tether 22, 122 relative to the extension 118. In a configuration where the airbag 14 includes both the extension 18 and the extension 118, one tether 22 may connect the extension 18 to the base 12 and another tether 22 may connect the extension 118 to the base 12. Alternatively, one tether 122 may connect the extension 18 to the base 12 and another tether 122 may connect the extension 118 to the base 12. Alternatively, one tether 22 of the first embodiment may connect one of the extensions 18, 118 to the base 12 and one tether 122 of the second embodiment may connect the other of the extensions 18, 118 to the base 12.

In both the embodiment of FIGS. 3-4 and the embodiment of FIGS. 5-6, the tether 22, 122 extends between a first end 34 and a second end 36. The first end 34 of the tether 22, 122 is anchored when the airbag 14 is in the uninflated position. For example, the first end 34 may be fixed to the base 12 of the airbag 14, as shown in FIGS. 4 and 6. Alternatively, for example, the first end 34 may be fixed to the steering wheel 26 and/or to a steering column 38 of the vehicle 24. The first end 34 of the tether 22, 122 may be anchored in any suitable manner, e.g., fusing, adhesive, integral formation (i.e., simultaneous formation of the airbag 14 and the tether 22, 122 fixed to the extension 18), etc.

The second end 36 of the tether 22, 122 is fixed to the extension 18 when the airbag 14 is in the uninflated position. For example, the tether 22, 122 may be stitched to the extension 18, as shown in FIGS. 4-7. Alternatively, the tether 22, 122 may be fixed to the extension 18 in any suitable manner, e.g., fusing, adhesive, integral formation (i.e., simultaneous formation of the airbag 14 and the tether 22, 122 fixed to the extension 18), etc.

Figure 7:
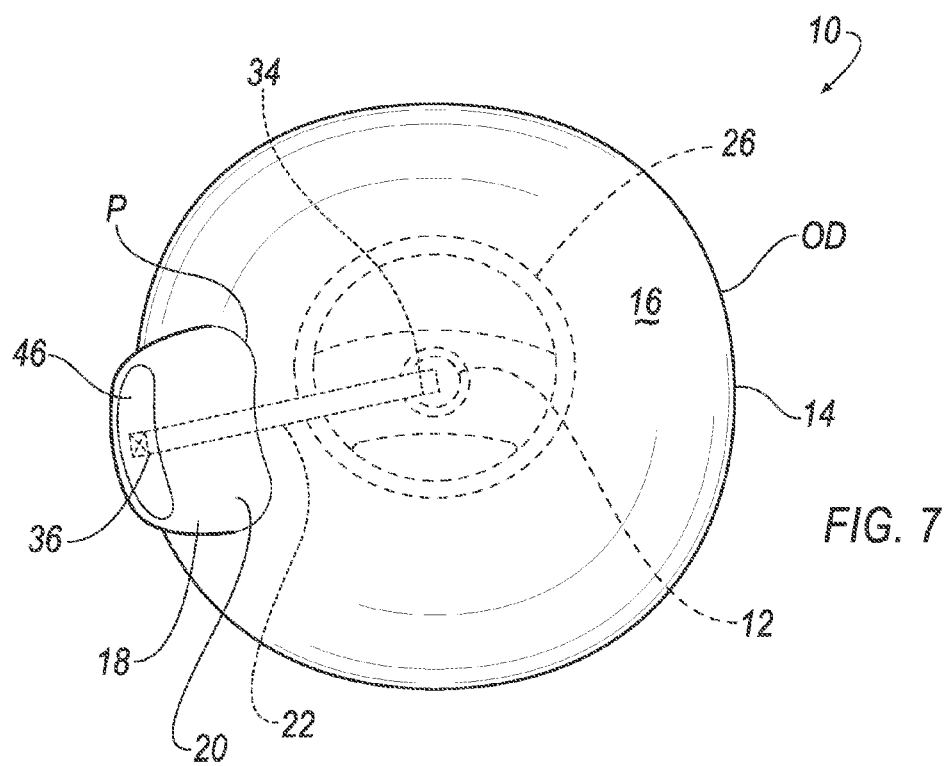
FIG. 7 is a perspective view of the airbag module of FIG. 6 with the airbag in the inflated position and the extension in the deployed position.

The tether 22, 122 is configured to selectively retain the extension 18 in an undeployed position, i.e., a retracted position, relative to the impact surface 16, as shown in FIGS. 4 and 6 and to selectively release the extension 18 to a deployed position, i.e., an extended position, relative to the impact surface 16, as shown in FIGS. 5 and 7. Specifically, as set forth further below for example, the vehicle 24 includes an impact sensing system 40 that may sense an impact of the vehicle 24 and may trigger inflation of the airbag 14 in response to a sensed impact. In addition, the impact sensing system 40 may sense the type of impact, e.g., based on direction, magnitude, etc.

Based on the type of sensed impact, the impact sensing system 40 may trigger release of the tether 22, 122 to allow the extension 18 to move to the deployed position. For example, if the impact sensing system 40 detects a head-on impact, the tether 22, 122 may retain the extension 18 in the undeployed position. Alternatively, for example, if the impact sensing system 40 detects an oblique impact, the impact sensing system 40 may trigger release of the tether 22, 122 to release the extension 18 to the deployed position. In the configuration including the two extensions 18, 118, the impact sensing system 40 may be configured to select which one of the extensions 18, 118 are deployed and/or may be configured to deploy both extensions 18, 118.

As one example, the impact sensing system 40 may be configured to inflate the airbag 14 to various inflation pressures in response to various types of impacts to release/not release the tether 22, 122. For example, the impact sensing system 40 may be configured to trigger inflation of the airbag 14 to a first inflation pressure to inflate the airbag 14 to the inflated position and retain the extension 18 in the undeployed position, e.g., in response to types of impact for which it is desired to retain the extension 18 in the undeployed position. Conversely, the impact sensing system 40 may also be configured to trigger inflation of the airbag 14 to a second inflation pressure higher than the first inflation pressure to inflate the airbag 14 to the inflated position and release the tether 22, 122 and inflate the extension 18 to the deployed position.

For example, with reference to the embodiment of FIGS. 4-6, the tether 22 may be configured remain connected from the base 12 to the extension 18 when the airbag 14 is inflated to the first inflation pressure and to break between the base 12 and the extension 18 when the airbag 14 is inflated to the second inflation pressure higher than the first inflation pressure. For example, as shown in FIG. 5, when the airbag 14 is inflated to the second inflation pressure, the first end 34 of the tether 22 may release by separating from base 12, e.g., in the configuration where the first end 34 is stitched or adhered to the base 12, the stitching or adhesive between the first end 34 and the base 12 may break when the airbag 14 is inflated to the second inflation pressure.

Alternatively, the tether 22 may be configured to release by breaking between the first end 34 and the second end 36. For example, the tether 22 may include a weakened area (not shown) between the first end 34 and the second end 36 that is configured to remain connected, i.e., configured to not break, when the airbag 14 is inflated to the first inflation pressure, and is configured to release by breaking when the airbag 14 is inflated to the second inflation pressure. As another example, the tether 22 may include a break (break) between the first end 34 and the second end 36 that is stitched together with stitching configured to remain connected, i.e., configured to not break, when the airbag 14 is inflated to the first inflation pressure, and is configured to release by breaking when the airbag 14 is inflated to the second inflation pressure.

Alternatively, the airbag module 10 may include a cutter (not shown) engaged with the tether 22 and in communication with the impact sensing system 40. The cutter may be supported by the base 12. When the impact sensing system 40 senses a vehicle impact for which the extension 18 should be released to the deployed position, the cutter cuts the tether 22 to allow the extension 18 to be inflated to the deployed position.

With reference to the embodiment of FIGS. 6-7, the tether 122 may include a loop 42 configured to retain the extension 18 in the undeployed position relative to the impact surface 16 when the airbag 14 is inflated to the first inflation pressure and to release by unraveling when the airbag 14 is inflated to the second inflation pressure. For example, the loop 42 may be formed by stitching 44 that is configured to remain connected, i.e., configured to not break, when the airbag 14 is inflated to the first inflation pressure, and is configured to break when the airbag 14 is inflated to the second inflation pressure. In such an embodiment, the loop 42 may be sized to retain the extension 18 in the undeployed position and the tether 122 may be sized such that, when the loop 42 is broken, the tether 122 allows the extension 18 to move to the deployed position. Although only one loop 42 is shown in FIG. 5, the tether 122 may include multiple loops 42 with each loop 42 configured to unravel at different inflation pressures such that the extension 18 may extend to various deployed positions and/or in stages.

When the airbag 14 is in the inflated position and the extension 18 is in the undeployed position, the extension 18 may be flush with the impact surface 16 around the perimeter of the extension 18. Alternatively, the extension 18 in the undeployed position may be slightly indented or slightly bulged outwardly relative to the impact surface 16 around the perimeter of the extension 18. When the airbag 14 is in the inflated position and the extension 18 is in the deployed position, the extension 18 extends farther outwardly relative to the impact surface 16. As set forth above, the perimeter surface 20 of the extension 18 extends transversely from the impact surface 16 around the perimeter of the extension 18

As set forth above, the perimeter surface 20 of the extension 18 extends around the perimeter of the extension 18. In other words, the perimeter surface 20 is continuous, and the perimeter surface 20 extends entirely around and encloses the portion of the inflation chamber that extends into the extension 18.

As set forth above, the perimeter surface 20 extends transversely from the impact surface 16. In other words, the perimeter surface 20 extends along a path that crosses a line along which the impact surface 16 extends near the extension 18. The perimeter surface 20 may extend at a right angle, i.e., 90 degrees, relative to the impact surface 16. A transition from the perimeter surface 20 to the impact surface 16 may be angular or may be rounded.

The extension 18 includes an end 46 spaced from the impact surface 16. The second end 36 of the tether 22, 122 may be connected to the end 46. The end 46 may be flat, as shown in FIGS. 2-7, or may be rounded. The extension 18 shown in FIGS. 2-7 has a kidney shaped cross-section, however, the extension 18 may have any suitable shape.

With reference to FIGS. 2-7, the impact surface 16 is the surface of the airbag 14 directly in front of the test dummy 30 and may be the surface that the test dummy 30 initially impacts during a vehicle impact. The impact surface 16 may extend in a cross-vehicle direction. For example, the impact surface 16 may extend in a plane generally perpendicular to the longitudinal axis of the vehicle. The impact surface 16 may extend to an outer perimeter OP of the airbag 14. As shown in FIGS. 4 and 6, a diameter DE of the extension 18 through the perimeter surface 20 is less than a diameter DI of the impact surface 16.

During inflation of the airbag 14 from the uninflated position to the inflated position, the airbag 14 extends in a first direction D from the base 12 to the impact surface 16, as identified in FIG. 2. Specifically, the first direction D extends generally in a vehicle-rearward direction from the base 12 to the impact surface 16, e.g., in parallel with the longitudinal axis of the vehicle 24. During inflation of the extension 18 from the undeployed position to the deployed position, the extension 18 extends from the impact surface 16 in the first direction. In other words, the extension 18 extends from the impact surface 16 in the same direction as the airbag 14 extends from the base 12.

The airbag 14 defines an inflation chamber (not numbered) that is inflated with an inflation medium, as set forth further below. The inflation chamber extends into the extension 18 when the extension 18 is in the deployed position. The inflation chamber may be open to the extension 18 along the entire inside perimeter of the extension 18. Alternatively, for example, a vent may be disposed in the inflation chamber at the extension 18 for controlling gas flow into the extension 18.

The airbag 14 may be formed of any suitable type of material, e.g., from a woven polymer. For example, the airbag 14 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

The airbag module 10 includes an inflator 54 (shown schematically in FIG. 8) in communication with the inflation chamber to expand the inflation chamber with the inflation medium, such as a gas. The inflator 54 may be, for example, a pyrotechnic inflator 54 that uses a chemical reaction to drive inflation medium to the inflation chamber. The inflator 54 may be of any suitable type, for example, a cold-gas inflator.

The base 12 of the airbag module 10 may be define a cavity that houses the airbag 14 in the uninflated position. The base 12 may support the inflator 54 and may be mounted to the steering wheel 26 and/or the steering column 38 to support the airbag module 10 on the steering wheel 26 and/or the steering column 38. The base 12 may be mounted to the steering wheel 26 and/or the steering column 38 in any suitable manner.

Figure 8:
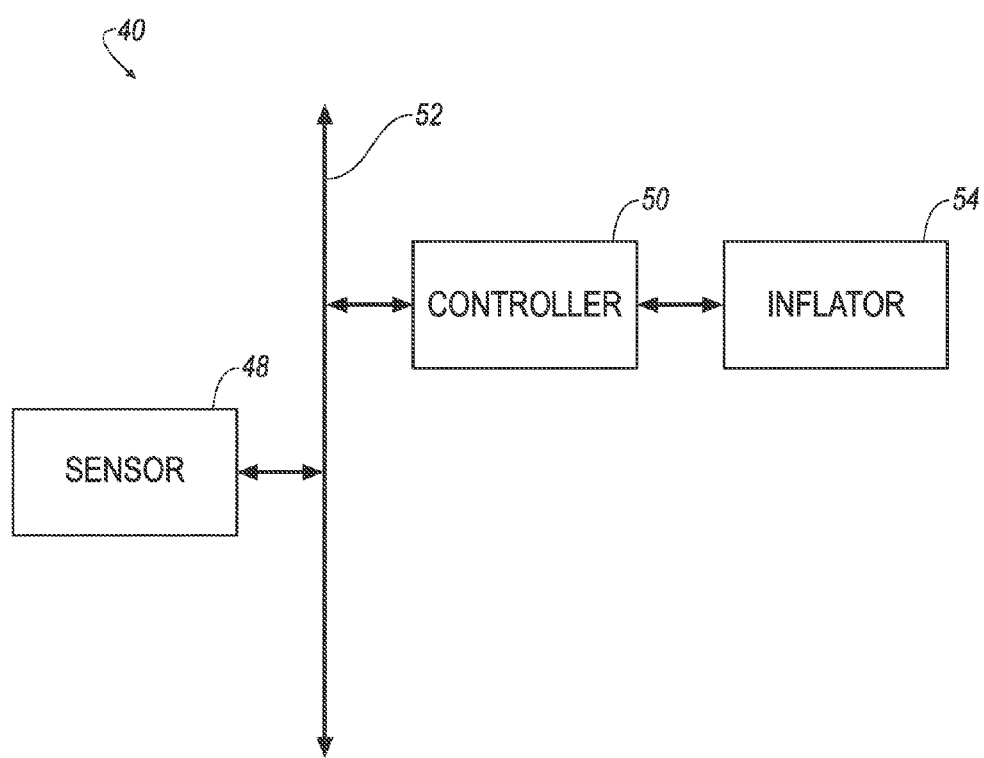
FIG. 8 is a schematic of an impact sensing system of the vehicle.

A schematic of the impact sensing system 40 is shown in FIG. 8. The impact sensing system 40 may include at least one sensor 48 for sensing impact of the vehicle 24, and a controller 50 in communication with the sensor 48 and the inflator 54 for activating the inflator 54, e.g., for providing an impulse to a pyrotechnic charge of the inflator 54, when the sensor 48 senses an impact of the vehicle 24. Alternatively or additionally to sensing impact, the impact sensing system 40 may be configured to sense impact prior to impact, i.e., pre-impact sensing. The sensor 48 may be of any suitable type, e.g., using radar, lidar, and/or a vision system. The vision system may include one or more cameras, CCD image sensors, and/or CMOS image sensor, etc.

The controller 50 may be a microprocessor-based controller. The sensor 48 is in communication with the controller 50 to communicate data to the controller 50. Based on the data communicated by the sensor 48, the controller 50 instructs the inflator 54 to activate.

The controller 50 and the sensor 48 may be connected to a communication bus 52, such as a controller area network (CAN) bus, of the vehicle 24. The controller 50 may use information from the communication bus 52 to control the activation of the inflator 54. The inflator 54 may be connected to the controller 50, as shown in FIG. 8, or may be connected directly to the communication bus 52.

In operation, the airbag 14 is in an uninflated position, as shown in FIG. 1, under normal operating conditions of the vehicle 24. When the sensor 48 senses an impact of the vehicle 24, the impact sensing system 40 triggers the inflator 54 to inflate the airbag 14 with the inflation medium from the uninflated position to an inflated position. In particular, based on the type of impact sensed by the impact sensing system 40, the impact sensing system 40 inflates the airbag 14 to the inflated position with the extension 18 in the undeployed position, as shown in FIGS. 4 and 6, or inflates the airbag 14 to the inflated position with the extension 18 in the deployed position, as shown in FIGS. 2, 4, and 6.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An airbag module comprising:
    a base;
    an airbag supported by the base, the airbag being inflatable from an uninflated position to an inflated position and presenting an impact surface spaced from the base in the inflated position;
    the airbag including an extension having a perimeter surface extending transversely from the impact surface around a perimeter of the extension; and
    a tether extending from the base to the extension in the uninflated position.

2. The airbag module as set forth in claim 1 wherein the tether is configured to retain the extension in an undeployed position relative to the impact surface when the airbag is inflated to a first inflation pressure and to release the extension when the airbag is inflated to a second inflation pressure higher than the first inflation pressure.

3. The airbag module as set forth in claim 1 wherein the tether is configured remain connected to the extension when the airbag is inflated to a first inflation pressure and to break when the airbag is inflated to a second inflation pressure higher than the first inflation pressure.

4. The airbag module as set forth in claim 1 wherein the tether includes a loop configured to retain the extension in an undeployed position relative to the impact surface when the airbag is inflated to a first inflation pressure and to unravel when the airbag is inflated to a second inflation pressure higher than the first inflation pressure.

5. The airbag module as set forth in claim 1 wherein a diameter of extension through the perimeter surface is less than a diameter of impact surface.

6. The airbag module as set forth in claim 1 wherein the extension is positioned along an edge of the impact surface.

7. The airbag module as set forth in claim 1 wherein the airbag extends in a first direction from the base to the impact surface and wherein the extension extends from the impact surface in the first direction.

8. A vehicle comprising:
    a steering wheel;
    a driver side door;
    an airbag supported by the steering wheel, the airbag being inflatable from an uninflated position to an inflated position and presenting an impact surface spaced from the steering wheel in the inflated position;
    the airbag including an extension disposed between the impact surface and the driver side door; and
    a tether extending from the steering wheel to the extension in the uninflated position.

9. The vehicle as set forth in claim 8 wherein the extension has a perimeter surface extending transversely from the impact surface around a perimeter of the extension.

10. The vehicle as set forth in claim 9 wherein a diameter of extension through the perimeter surface is less than a diameter of impact surface.

11. The vehicle as set forth in claim 8 wherein the tether is configured to retain the extension in an undeployed position relative to the impact surface when the airbag is inflated to a first inflation pressure and to release the extension when the airbag is inflated to a second inflation pressure higher than the first inflation pressure.

12. The airbag module as set forth in claim 8 wherein the tether is configured remain connected to the extension when the airbag is inflated to a first inflation pressure and to break when the airbag is inflated to a second inflation pressure higher than the first inflation pressure.

13. The airbag module as set forth in claim 8 wherein the tether includes a loop configured to retain the extension in an undeployed position relative to the impact surface when the airbag is inflated to a first inflation pressure and to unravel when the airbag is inflated to a second inflation pressure higher than the first inflation pressure.

14. The vehicle as set forth in claim 8 wherein the extension is positioned along an edge of the impact surface.

15. The vehicle as set forth in claim 8 wherein the airbag extends in a first direction from the base to the impact surface and wherein the extension extends from the impact surface in the first direction.

* * * * *